United States Patent [19]

Bigalke et al.

[11] 3,888,220
[45] June 10, 1975

[54] INTERNAL COMBUSTION ENGINE PERFORMANCE CONTROL SYSTEM

[75] Inventors: Erhard Bigalke, Wolfsburg; Dietrich Radmann, Flechtorf; Erwin Klein; Rainer Melichar, both of Regensburg; Kurt Biedermann, Stallwang, all of Germany

[73] Assignee: Volkswagenwerk Aktiengesellschaft, Wolfsburg, Germany

[22] Filed: Aug. 28, 1973

[21] Appl. No.: 392,188

[30] Foreign Application Priority Data
Aug. 29, 1972 Germany............................ 2242477

[52] U.S. Cl..... 123/117 R; 123/146.5 A; 123/148 E
[51] Int. Cl............................................. F02p 5/08
[58] Field of Search.... 123/32 AE, 32 EA, 146.5 A, 123/148 E, 117 R, 179 L, 179 BG

[56] References Cited
UNITED STATES PATENTS

| | | | |
|---|---|---|---|
| 3,314,407 | 4/1967 | Schneider.................... | 123/148 E |
| 3,660,689 | 5/1972 | Oishi et al..................... | 123/148 E |
| 3,734,067 | 5/1973 | Glocker et al................. | 123/179 L |
| 3,738,339 | 6/1973 | Huntzinger et al............ | 123/117 R |
| 3,749,070 | 7/1973 | Oishi et al..................... | 123/32 EA |
| 3,757,755 | 9/1973 | Carner.......................... | 123/32 EA |
| 3,771,502 | 11/1973 | Reddy........................... | 123/179 L |
| 3,810,448 | 5/1974 | Ford.............................. | 123/32 EA |
| 3,811,420 | 5/1974 | Vogel............................ | 123/117 R |

Primary Examiner—Charles J. Myhre
Assistant Examiner—Paul Devinsky
Attorney, Agent, or Firm—Brumbaugh, Graves, Donohue & Raymond

[57] ABSTRACT

A performance control system for an internal combustion engine uses at least two operating parameters of the engine for adjustment of at least one engine performance variable. The adjusted variable has at least one characteristic performance curve of values that vary as a function of the operating parameters. The system includes (1) an information storage arrangement for storing the characteristic performance curve values, (2) an information receiver, responsive to the operating parameters, that determines a curve value associated with specific operating parameter values and that produces first electrical pulses having amplitudes related to the determined curve value, (3) an analyzer that receives the first pulses and produces second electrical pulses having duration times related to the first pulse amplitudes and (4) a control arrangement that adjusts the engine performance variable in response to the duration time of the second pulse.

31 Claims, 6 Drawing Figures

INTERNAL COMBUSTION ENGINE PERFORMANCE CONTROL SYSTEM

BACKGROUND OF THE INVENTION

Previous attempts have been made to provide for performance curve control of various processes or performance variables within an internal combustion engine. Performance curve control is taken to mean control of engine performance variables such a (1) timing of the ignition point in spark-ignited, internal combustion engines, i.e., the ignition advance angle, (2) injection time in fuel-injected, internal combustion engines, (3) secondary air quantity added to an exhaust gas burning device, (4) exhaust gas recirculation in an internal combustion engine so modified, and the like; such control being accomplished as a function of at least two operating parameters of the internal combustion engine.

The U.S. Pat. No. 3,707,951 to Bigalke et al. discloses a method whereby two out of three possible parameters, that is, intake manifold pressure, engine revolutions per minute (RPM) and throttle valve position, are used for performance curve control of a gasoline injection engine. In the disclosed arrangement, "optical-electronic" storage consisting of surface elements of a storage disk are provided with the elements having varying densities. The density of the various elements depends on the storage value of the parameters paired in each case, for example, the actuation time of the injection valve, and the value stored is transferred from the storage by means of a lamp and a radiation-responsive pickup.

Other storage-control systems are known, however, that operate by means of a mechanical, two-dimensional cam, which is displaced along its axis for a distance proportional to one of the two parameters, for example, intake manifold pressure, and is rotated about its axis through an angle proportional to a second parameter, for example, engine RPM. Performance curve control is also possible with such a two-dimensional cam.

SUMMARY OF THE INVENTION

There is provided in accordance with the invention, an improved and simplified performance control system that uses regulating signals from the values stored in a storage arrangement, such as an optical-electronic device or a mechanical two-dimensional cam.

More specifically, the invention is concerned with the performance curve control of the ignition angle advance of a spark-ignition, internal combustion engine as well as the performance curve control of the time of injection of a fuel-injected, internal combustion engine. Various circuit components of the circuits for performance curve control of these two parameters are common to both, however, control of the injection period as a function of time and control of the ignition angle advance as a function of the engine RPM cannot be easily defined in relation to an outward fixed frame of reference due to the variable speed of the engine. Adjustment of each of the circuits to satisfy the particular parameter is therefore required.

The present performance control system departs from the arrangement disclosed in the U.S. Pat. No. 3,707,951, described above, in that, for a spark-ignited, internal combustion engine, the system uses at least two operating parameters of the engine for adjustment of the engine ignition spark advance, the ignition advance being dependent upon at least one characteristic performance curve of values that vary as a function of the operating parameters. The system includes (1) an information storage arrangement for storing the characteristic performance curve values, (2) an information receiver, that is connected to the storage arrangement that responds to the operating parameters, for extracting from the storage arrangement a curve value associated with specific operating parameter values and producing a first electrical signal having an amplitude related to the determined curve value, (3) an analyzer circuit connected to the information receiver for receiving the first signal and producing electrical pulses having duration times related to the first signal amplitude, and (4) a control unit connected to the analyzer circuit for triggering the engine ignition in response to the electrical pulse. In accordance with the present invention, the analyzer circuit, for control of ignition spark advance, will include (1) an integrator for receiving the first signal during a predetermined crankshaft angle of rotation and producing an integrated voltage output, (2) a time-controlled storage element, connected to the integrator, for storing the integrated voltage output, and (3) a comparator connected to the time-controlled storage unit for receiving and comparing the integrated voltage output to an increasing voltage signal predetermined slope beginning at the end of the predetermined crankshaft angle of rotation, and producing an electrical pulse when the increasing voltage signal equals the integrated voltage output.

The term "crankshaft angle of rotation" is used as it has become a commonly used term. As a matter of principle, the ignition spark advance angle may be related to any part of the internal combustion engine rotating in proportion to the engine RPM.

As described above, the voltage on the integrator during integration has a slope that is a function of the specific amplitude value of the amplitude signal. After integration, however, the integrated voltage output is not only a function of the amplitude signal but also of the engine RPM, since integration occurs during a given crankshaft angle, preferably 45°. As a result of the interrelation between the crankshaft angle of rotation and the engine RPM, on the one hand, and time, on the other hand, it is possible to compare, in a comparator, the integrated voltage output with a rising sawtooth signal, which is delivered to the comparator at a precise instant, that is, after termination of the integration process. The output signal of the comparator, in accordance with the invention, is a trailing pulse edge which triggers the ignition and is related to a specific engine RPM and a predetermined crankshaft angle, e.g., 45° before top dead center (OT).

On starting of the internal combustion engine, it is preferable to fix a constant ignition advance angle, which is independent of the valves stored for the operating parameters at starting. Thereby, the performance curve control becomes effective only during full operation of the internal combustion engine. A preferred embodiment of the invention includes, therefore, a starter circuit connected to the comparator that, on actuation of the starter of the internal combustion engine, skips the integrated voltage in order to obtain a constant ignition advance angle.

During a predetermined crankshaft angle, the amplitude signals of rotation are delivered to an integrator and, therefore, the predetermined crankshaft angle of rotation must be defined electrically. In accordance with a further preferred embodiment of the invention the predetermined crankshaft angle of rotation is defined by two pulse trains, one of which can be delivered by a dynamic crankshaft angle transmitter and the other by a firing contact. The firing contact pulse train synchronizes individual control groups of the control system whereas the dynamic crankshaft angle transmitter delivers periodic pulses, for example, every 45′ of crankshaft revolution. It is also possible to control the various circuit groups of the control system using two pulse trains that are delivered by two static crankshaft angle transmitters, which form a double generator delivering a signal when the crankshaft has stopped, that is, a contact is in the opened or closed position.

In accordance with the present invention, the analyzer circuit, for adjustment of the engine ignition spark advance, may also include (1) a first integrator that intergrates a constant voltage and produces and increasing second signal of predetermined slope during a predetermined crankshaft angle of rotation, (2) a time-controlled storate unit connected to the first integrator that stores the second signal at the end of the predetermined crankshaft angle of rotation and produces a third signal that has an amplitude proportional to the amplitude of the stored signal, (3) a second integrator that receives the first signal at the end of the predetermined crankshaft angle of rotation an produces an integrated voltage output, and (4) a comparator connected to the time-controlled storage unit that receives and compares the integrated voltage output to the third signal and produces an electrical pulse when the integrated voltage output equals the third signal.

The present invention also concerns a performance control system for a fuel-injected, internal combustion engine that uses at least two operating parameters of the engine for adjustment of the time of actuation of the engine fuel injection valves, the valve injection time being dependent upon at least one characteristic performance curve of values that vary as a function of the operating parameters. The system includes (1) an information storage arrangement for storing the characteristic performance curve values, (2) an information receiver, that is connected to the storage arrangement and that responds to the operating parameters, for extracting from the storage arrangement a curve value associated with specific operating parameter values and for producing a first electrical signal having an amplitude related to the determined curve value, (3) an analyzer circuit connected to the information receiver for receiving the first signal and producing electrical pulses having duration times related to the first signal amplitude, and (4) a control unit connected to the analyzer circuit for actuating at least one engine fuel-injection valve in response to the actuating pulse. In accordance with the present invention, the analyzer circuit, for adjustment of the time of actuation of the fuel injection valves will include (1) apparatus for receiving the first signal and producing a second signal, the amplitude of the second signal increasing as the integral of the first signal amplitude for a predetermined period following a given engine and decaying at a given rate following said predetermined period, the predetermined period being initiated at a prescribed angular position of the engine crankshaft, and (2) a comparator that receives the second signal and produces an actuating pulse beginning at the start of predetermined period, and terminating when the second signal equals a predetermined voltage level.

The fuel injection control embodiment of the present invention may be employed whether or not an arrangement for performance curve control of the ignition advance angle is present. As described above, integration of the amplitude signal occurs in the fuel injection control embodiment such that the slope of the integrated voltage is determined by the amplitude signal. In the event that an optical-electric storage, as defined above, is used, a storage arrangement with a surface element having varying opacity and representing the characteristic performance curve values for injection time based on two operating parameters is positioned in the light path between a radiation generator and a radiation-responsive pickup, for example, a photoelectric cell or a photodiode. However, while integration occurs during a predetermined crankshaft angle of rotation during performance curve control of the ignition advance angle, the value of the integrated voltage for performance curve control of the injection time is determined by a predetermined integration period.

Furthermore, for performance curve control of the ignition advance angle, a time-controlled storage unit for storing integrated voltage output is an essential component of the control system, while, for purposes of performance curve control of the injection time, a discharge of the integrator with a predetermined slope to a predetermined amplitude value takes place following termination of the predetermined period, that is, following termination of the integration process and there is produced, by means of a comparator, a pulse having a length corresponding to the time of charging and discharging of the integrator that is an actuating pulse for the injection valve.

For example, if a higher amplitude signal is present at the input of the integrator, the integrated voltage signal has a greater value and the trend with respect to time of the voltage on the integrator during the discharge is parallel to the time gradient of the voltage for a smaller amplitude signal.

Since the slope of the voltage gradient during discharge of the integrator is included in the duration of the actuating pulse generated by the comparator, it is possible to superimpose on the integrator during discharge, at least one corrective factor depending upon a further selected operating parameter of the internal combustion engine, for example, the temperature of a cylinder head. It then becomes possible to adjust the duration of the injection pulse to a specific cylinder head temperature.

Still another control possibility is presented, in accordance with the invention. The predetermined voltage level, to which the integrator is to be discharged, may be determined by at least one additional operating parameter, for example, the temperature of the air drawn into the engine.

Similar to the performance control system for control of the ignition angle advance it will be useful to include a starter circuit in the control system for the injection duration. When adjusting the injection time, however, the starter circuit need not eliminate the storage arrangement when the starter of the internal combustion engine is actuated; it is necessary only that the integrated voltage be increased that the injection time is increased. Thereby an enriched mixture is present in the combustion chamber of the internal combustion or rotary engine during the starting process.

For performance curve control of both the ignition advance angle and the injection time, triggering of the various circuit groups is accomplished by two pulse trains, one of which may be generated by an inductive crankshaft angle transmitter and the other by the ignition contact. In a control system effecting performance curve control of several variables, such as ignition advance angle and injection time, the pulse trains may also be utilized to control gate circuits connected with the integrators so that signals derived from the pulse trains permit the amplitude signals to be forwarded to the integrators only during the predetermned crankshaft angle of rotation or during the predetermined time. Considering a storage arrangement with a storage layer subdivided into surface elements of varying opacity, the characteristic performance curve values for the ignition advance angle and the injection time are simultaneously forwarded to their respective receivers and the amplitude signals generated in the receivers are forwarded through the controlled gate circuits to the individual integrators only during different fixed time periods, possible independent of one another.

When gallium arsenide diodes are used as radiation generators, difficulties may occur due to overheating during extended operation and the aforementioned two pulse trains may again be used to advantage. Using the pulse trains it is possible to control a current generator for the radiation generators in such a manner that the current generator delivers current impulses during the predetermined crankshaft angle of rotation and the predetermined time. If, at the same time, gate circuits preceding the integrators are provided, it becomes possible to supply several radiation generators by way of one conductor.

If several radiation generators are used there arises the problem, resulting from the sensitivity of the performance curve control, that a spread between units must be provided at considerably increased expense. Thus, it would not be adequate to provide for common radiation generator, supply current signal amplitude regulation. Accordingly, a further embodiment of the invention includes two radiation generators supplied by one line. For regulation of amplitude of the current signal, the light generated by each radiation generator bypasses the storage layer and impinges on their respective inputs for time-controlled gate circuits preceding the current signal regulators. Time-control is obtained by means of pulses derived from the two pulse trains as described above. Thereby, individual regulation for the current destined for each of the two radiation generators is obtained in a single regulator. If necessary, more than two radiation generators may be accomodated if they are acted on during different time intervals.

BRIEF DESCRIPTION OF THE DRAWINGS

A better understanding of the invention can be gained from a consideration of the following description of preferred embodiments, in conjunction with the appended figures of the drawings, wherein.

DETAILED DESCRIPTION OF THE PREFERRED EMBODIMENTS

Figure 1:
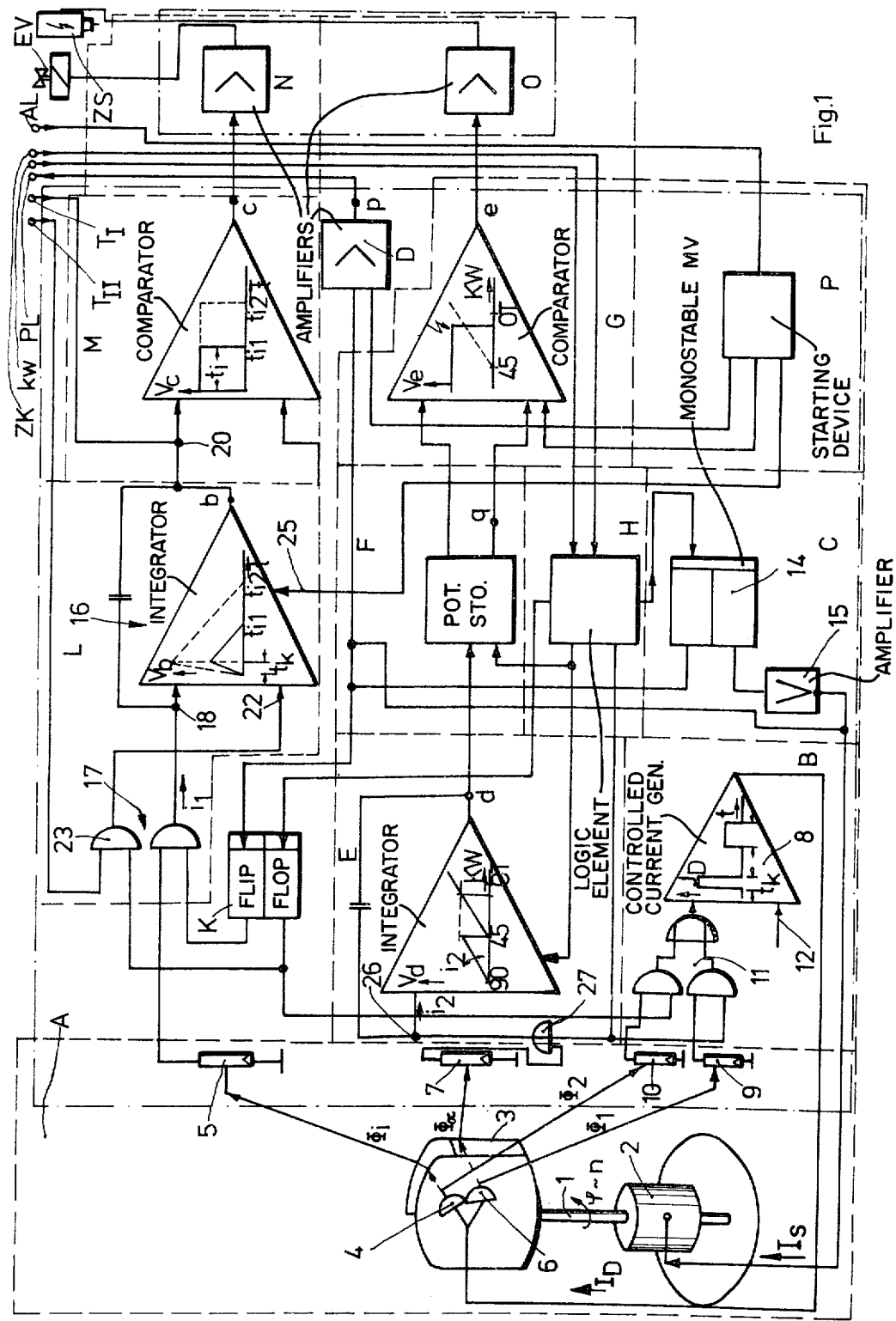
FIG. 1 is a block diagram of a performance control system in accordance with the invention.

Referring to FIG. 1, an optical-electronic storage unit A has gallium arsenide diode radiation generators 4,6 that are driven by current pulses from the controlled pulse generator B. In the storage arrangement A, the radiation generators 4,6 and a storage layer 3 are mounted on a shaft 1, which rotates in proportion to the specific revolution per minute (RPM) of an internal combustion engine. Such proportional rotation is accomplished by means of a current, the amplitude of which is proportional to the RPM of the engine and is provided by unit C.

An essential component of unit C is the monostable multivibrator 14, which may also be used to produce pulses for other purposes within the performance control system. For example, the multivibrator 14 is instrumental in control of the fuel pump relay by way of the amplifier D to the terminal PL.

For performance control of the ignition angle advance, analogue amplitude signals obtained from the storage layer 3 that correspond to specific characteristic performance curve values, are applied to the integrator E. The integrated voltage output of the integrator E, that is, the voltage stored after the passing of a predetermined crankshaft angle, is applied to the time-controlled potential storage F and, by comparison in the comparator G with a known saw-tooth voltage, the integrated voltage is subsequently converted into a time representation.

Figure 2:
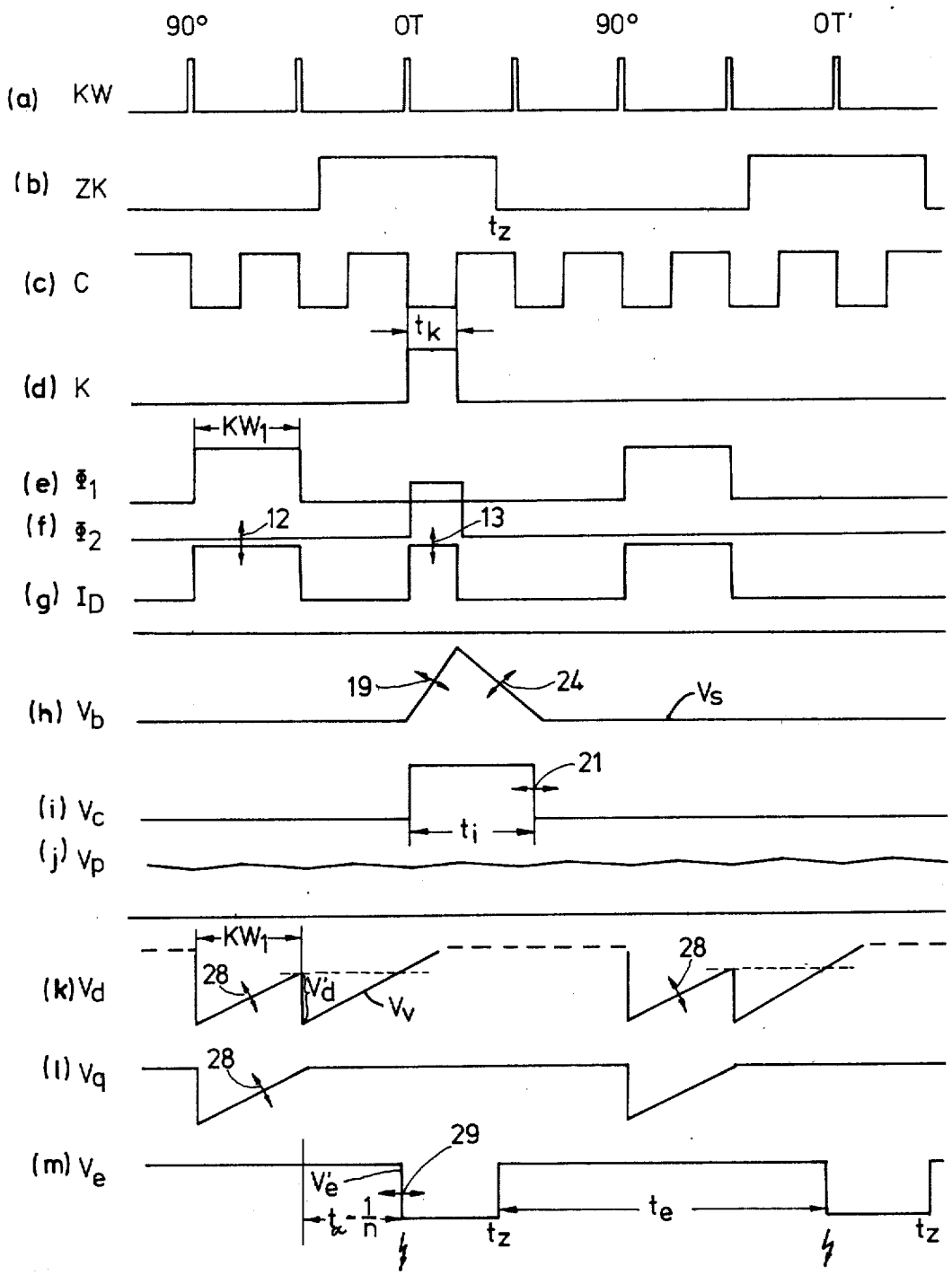
FIG. 2 is a series of graphs of several signal waveforms, showning the time relationship among the signals developed in various portions of the FIG. 1 system.
Figure 6:
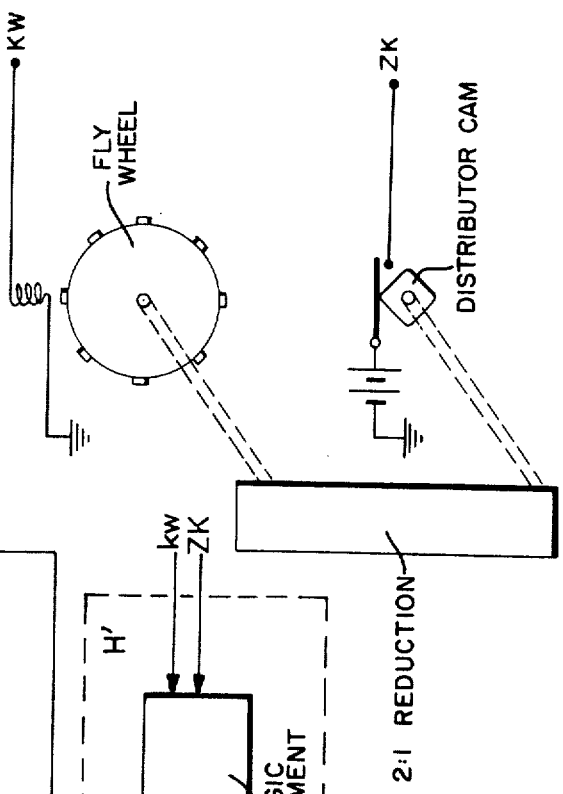
FIG. 6 is a schematic diagram showing conventional apparatus for generating control signals in an internal combustion engine.

An essential element of the performance control system is the crankshaft angle logic element H, which is controlled by two pulse trains. The first pulse train is obtained from a crankshaft angle transmitter and is applied to the logic element H via the terminal kw. The second train is obtained from an ignition contact controlled by the distributor shaft and is applied to the logic element H by way of the terminal ZK. Conventional apparatus for generating the first and second pulse train is shown in FIG. 6. The two pulse trains are represented in FIGS. 2a and 2b. As shown in FIG. 2a, the crankshaft angle transmitter produces a pulse every 45° of rotation of the crankshaft. Referring to FIG. 2b, the ignition contact generates periodic pulses every 180° of rotation of the crankshaft. The trailing pulse edge, characterized by the instant $tz$, causes the reconnection of the ignition coil.

The crankshaft angle logic element H converts these two pulse train input into pulses for (1) time-control of the potential storage F, (2) resetting pulses for the integrator E (after passage of the predetermined crankshaft angle), and (3) triggering pulses for the flip-flop K, which in turn generates the control pulses for the gate circuits in the components B, E, and L. Circuit unit L includes an integrator that is used to control the injection time of the internal combustion engine, namely, and that integrates the amplitude signal delivered to it during a constant time $t_K$, and is controlled by the monostable multivibrator in the circuit unit C. The periodic pulses having a constant length $t_K$ generated by the monostable multivibrator are represented in FIG. 2c.

The voltage gradient at the output b of the integrator L, including the rise of the voltage during integration and the drop of the voltage during discharge of the integrator, is analyzed, with respect to its duration in the comparator M, so that at the output of the comparator M there appears a pulse of corresponding length. The length of the pulse determines the injection time, which pulse, by way of the amplifier N, triggers the injection valve EV. A corresponding amplifier O is connected in series with the comparator E and leads to the ignition coil ZS.

Referring to FIG. 1, the optical-electronic storage arrangement A includes a shaft 1 that is rotated through an angle Q by the measuring device 2 in response to the control current $I_s$ produced in the circuit unit C. The angle Q is proportional to the revolutions per minute $n$ of the internal combustion engine.

In the present embodiment of the invention, the shaft 1 carries a storage layer 3 in the shape of a partial cylinder that is formed of a photographic film divided into contiguous surface elements with different varying densities. In the specific example shown in FIG. 1, the storage layer 3 includes two such surface elements. One of the surface elements cooperates with a gallium arsenide diode 4 and a photoelectric cell receiver 5 to store and produce a characteristic injection time value, whereas the other element cooperates with a gallium arsenide diode 6 and a photoelectric cell receiver 7 to store and produce a characteristic ignition advance value.

Another possibility for the displacement of the storage layer 3, which is disclosed in the U.S. Pat. No. 3,707,951, is to make the shaft 1 rotate as a function of the pressure in the intake manifold of the internal combustion engine.

The gallium arsenide diodes 4 and 6, which are integrated with optical devices, are thus faced by surface elements of the associated areas of the storage layer 3 as a function of the operating condition of the internal combustion engine represented by the number of revolutions $n$ or the suction pipe pressure. The facing surface elements have densities that reflect the required injection time and ignition advance angle as a function of the specific instantaneous values for engine RPM and intake manifold pressure. The corresponding light radiations through the storage layer 3 are indicated by $\Phi_i$ and $\Phi_\alpha$. The radiations are converted in photoelectric cells 5 and 7 into currents having amplitudes proportioned to the characteristics performance curve value stored in the storage layer 3 and are forwarded to the inputs of the integrators L and E through gate circuits to be described hereinafter.

The two gallium arsenide, radiation generators 4 and 6 have a common supply circuit into which is fed a pulse-shaped current $I_D$ from the regulated current generator 8. Since two radiation generators are used, it is not possible to regulate the amplitude of the current $I_D$ to effect a constant light radiation by both diodes 4 and 6 simultaneously. Therefore, the period is controlled during which the radiated light $\Phi_\alpha$ is forwarded to the receiver 7 and from there to the integrator E in form of an amplitude signal as is the period during which the radiated light $\Phi_i$ is delivered over the receiver 5 and from there in form of an amplitude signal to the integrator L. Accordingly, the light radiations $\Phi_1$ and $\Phi_2$ are forwarded to additional photoelectric receivers 9 and 10 which are connected to the actual value input of the controlled current generator 8 by way of the gate circuit 11. The desired value is delivered to the generator 8 over the additional input 12.

The gate circuit 11 operates such that during the integration time in the integrator E, electric signals from only the receiver 9 are delivered to the current generator 8, whereas during the integration time of the integrator L, only such signals as originate with the receiver 10 are forwarded to the generator. The gate circuit 11 is controlled by the flip-flop K which has output pulses as shown in FIG. 2d. The flip-flop K permits the output signals of the receiver 10 to be delivered to the current generator 8 only during the constant time $t_K$. In addition, the crankshaft angle logic element H permits the amplitude signals produced by the receiver 9 to be delivered to the current generator 8 only during the predetermined crankshaft angle of rotation during which the integrator E is in operation. By such time-controlled operation of the current generator 8, a pulsewise operation of the diodes 4 and 6 shown in FIGS. 2e, 2f and 2g, is also obtained. The radiated light $\Phi_1$ is adjusted to its desired value during the predetermined crankshaft angle $KW_1$, as indicated by arrow 12 in FIG. 2g, whereas the radiated light $\Phi_2$ is so adjusted during the time $t_K$, as indicated in FIG. 2g by the arrow 13.

In Unit C, which includes the monostable multivibrator 14 and an inverting amplifier 15, pulses delivered by the crankshaft logic element H are converted into a train of pulses of a constant length $t_K$, as shown in FIG. 2c. The constant length pulses effect the displacement of the shaft 1 of the storage arrangement A in a manner that is proportional to the engine RPM. The amplitude signals of the receiver 5, which are associated with a specific condition of operation, reflect the required injection time and are forwarded to the integrator 16 by way of gate circuit 17, which is controlled by the flip-flop K so that it delivers the amplitude signals to the input 18 of the integrator 16 only during the predetermined time interval $t_K$. Such time control of the integrator 16 is required since both gallium arsenide diodes 4 and 6 are actuated by the same supply circuit. The gate circuit 17 thus ensures that only such amplitude signal portion of the output of the receiver 5 is delivered to the input 18 as is present during the predetermined interval $t_K$.

Referring to FIG. 2h, the voltage at the output b of the integrator 16 is indicated as a function of time, and, during the time $t_K$, a voltage rise on the capacitor of the integrator has a slope that depends upon the amplitude of the amplitude signal $i_1$ delivered at the input 18 by the receiver 5 and that varies as shown by the arrow 19.

The voltage $V_b$ at the integrator output b drops again after time interval $t_K$ due to the discharge of the capacitor, until a predetermined voltage $V_s$ is attained. The value of $V_s$ may be varied in the present embodiment of the invention by superimposition of an electric signal on a terminal $T_I$ and thus the input 20 of a comparator M that represents any desired operating condition as, for example, the temperature of the air drawn into the engine. Thereby, the voltage pulse $V_c$, present at the comparator's output c (see FIG. 2i) may be varied with respect to the position to its trailing edge as a function of the selected operating condition, in accordance with the arrow 21. In addition, the supply battery voltage may enter into the position of the trailing edge of the pulse and, thus, into the injection time $t_i$ determined by the length of the pulse.

The pulse $V_c$ is delivered by way of the power amplifier N to the injection valve EV and may be further influenced by the superimposition of additional engine parameters. Accordingly, terminal $T_{II}$ is provided, which is connected intermittently with the input 22 of the integrator 16 by the gate circuit 17 and to which is applied an electric signal corresponding, for example, to the cylinder head temperature of the internal combustion engine. This element 23 of gate circuit 17 is also released by the flip-flop K, but only outside the integration time $t_K$. As shown by the arrow 24 in FIG. 2h, cylinder head temperature influences the discharge time, and thus, also the length of the pulse $V_c$ since as its trailing edge is defined by the intersection of the discharge portion of the voltage $V_b$ with the predetermined voltage $V_s$.

The starting device P, which is connected to the supply battery over the terminal AL when the starter of the internal combustion engine is actuated, superimposes on the integrator 16 a signal over the input 25 when the starter is actuated. The superimposed signal acts as an extension of the pulse $V_c$. This starter device P may also act as a control on the amplifier D, which at its output p delivers power for the pump relay, to terminal PL (see FIG. 2j).

In FIG. 1, the gradient of the voltages $V_b$ and $V_c$, appear for two different amplitude signals at the input 18 in the circuit unit L. Accordingly, two corresponding injection times $t_{i1}$ and $t_{i2}$ are shown.

For performance curve control in circuit units E, F and D of the firing angle $\alpha$, the amplitude signal produced in the receiver 7 is delivered to the input 26 of the integrator E over the gate 27 only during the predetermined crankshaft angle $KW_1$. Accordingly, the voltage $V_d$ at the output d of the integrator E has the time gradient indicated in FIG. 2k. During the predetermined crankshaft angle of rotation $KW_1$, the voltage $V_d$ rises as a function of the amplitude of the delivered signal $i_2$, as indicated by arrows 28 in FIG. 2k. At the end of the predetermined crankshaft angle of rotation $KW_1$ discharge occurs immediately. However, the integrated voltage $V_d'$ is stored in the timed potential storage F. The potential at the output q of the storage is designated by $V_q$ and is indicated in FIG. 2L.

Comparison of the amplitude values of the integrated voltage and a saw-tooth shaped comparison voltage $V_r$ now occurs in the comparator G. On equality of the amplitudes of the two voltages, the comparator G produces at its output e the voltage drop $V_e'$ of the voltage $V_e$, which triggers the ignition coil by way of the power amplifier O so that ignition occurs. Accordingly, for a fixed reference value for the fitting angle (in FIG. 2 in it is selected as 45° before OT) and a given crankshaft angle $\alpha$, a time $t_\alpha$ before ignition is defined, which time is in inverse proportion to the engine RPM $n$. Thus, the position of $V_e'$ is dependent upon $i_2$, in accordance with the arrows 29.

If $t_z$ designates the point in time at which the ignition coil is reconnected, a correspondingly modified connection of the integrator makes it possible to obtain regulation so that the point $t_z$ is adjusted to a switching-in interval $t_e$ which is constant over the entire speed range of the internal combustion engine.

During operation of the starter, there again occurs superimposition of control signals by the starting device P, however, when controlling the ignition spark advance, the amplitude signals delivered by the receiver 7 are eliminated so that during engine starting, a constant ignition angle is present.

Figure 5:
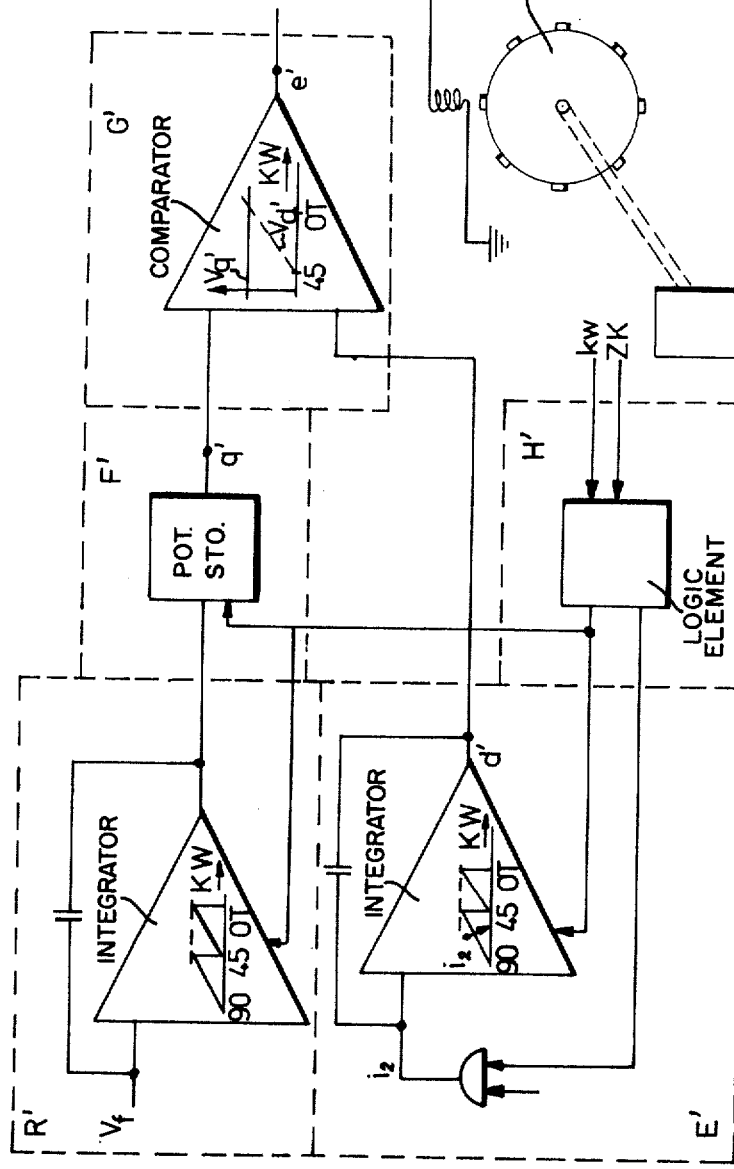
FIG. 5 is a block diagram of portion of a performance control system ascending to a further embodiment of the invention.

Ignition spark advance control may also be effected, in a modified manner, while retaining the circuit principle described above, as shown in FIG. 5. For example, in order to influence idling, i.e., in order to control the idling speed of the engine, the ignition angle may be effected by generating a sawtooth signal of a predetermined steepness determined by a prescribed voltage $V_F$ in an integrator R' during a predetermined crankshaft angle. The integrator is followed by a time controlled potential storage F' for the integrated voltage, which is delivered to a comparator G'. An additional sawtooth signal, having a slope determined by the amplitude signal $I_2$ is delivered to the comparator G'. At the end of the predetermined crankshaft angle, the logic element H' permits the integrated voltage and the increasing additional sawtooth voltage to be applied to the comparator G' and, on equality of the amplitudes of the integrated voltage and the additional sawtooth signal, the comparator G' produces an output signal triggering the ignition. In the previously described embodiment for control of the ignition advance angle, a sawtooth signal having a slope influenced by the amplitude signal $I_2$ is first produced and the integrated value is then stored after the termination of the predetermined crankshaft angle $KW_1$. In accordance with the modified embodiment of the invention, a sawtooth signal of constant rise is first generated so that the corresponding value of the integrated voltage designated by $V_d'$ in FIG. 2k would be a function of the engine RPM only and not a function of the performance curve information. In the modified embodiment, the additional sawtooth signal has a slope determined by the amplitude of the signal $i_2$ and the amplitudes of the integrated signal and the additional sawtooth signal are compared so that on equality of the amplitudes of the two signals, an output signal triggering the ignition is produced. The modified embodiment of the invention is of special advantage in the idling control of an internal combustion engine.

Figure 3:
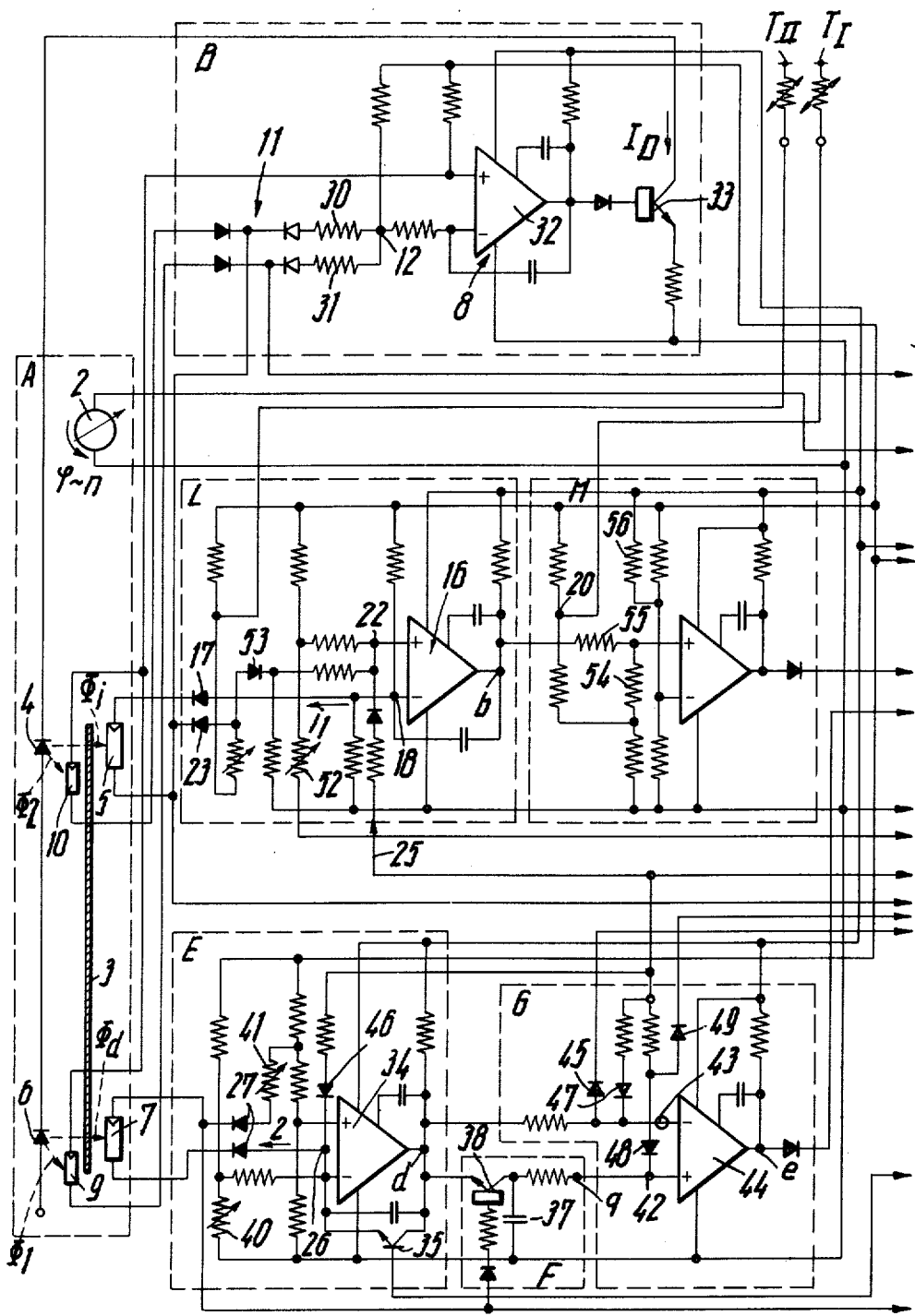
FIG. 3 is an electrical schematic of a portion of the system shown in FIG. 1.
Figure 4:
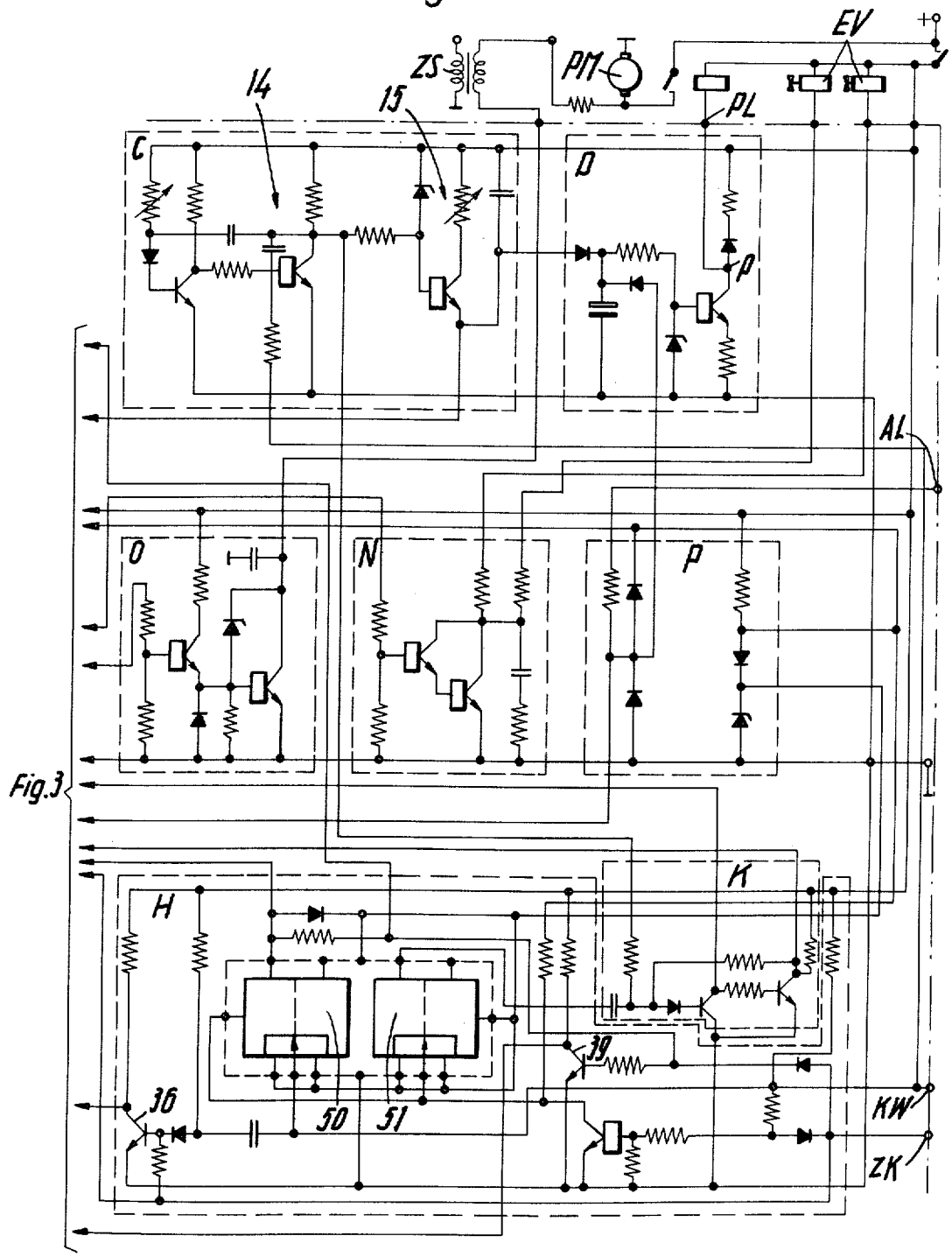
FIG. 4 is an electrical schematic matching FIG. 3 and showing a portion of the system of FIG. 1 that is not shown in FIG. 3.

FIGS. 3 and 4 represent a circuit designed for performance control of both the firing angle and the injection time of an internal combustion engine.

By properly choosing resistances 30 and 31 in the controlled pulse generator B, which supplies the current for the gallium arsenide diodes 4 and 6, various desired values for the current at input 12 may be obtained. One value applies to the injection time, i.e., the radiated light $\Phi_i$, and the other applies to the firing angle, i.e., the radiated light $\Phi$ . The controlled pulse amplifier B includes an operational amplifier 32 and a transistorized current amplifier 33. The current $I_D$ is regulated to obtain constant light radiations $\Phi_1$ and $\Phi_2$, so that temperature and other disturbing influences are controlled.

Essential components of the integrator E are on operational amplifier 34 and a switch 35, which is controlled by a pulse amplifier 36 in the crankshaft logic element H. The switch 35 resets the operational amplifier 34 at 90° before OT. From 90° to 45° before OT, the operational amplifier 34 integrates the amplitude signal i2 and produces an electrical signal having a sloe that is a function of the amplitude signal $i_2$ and, therefore, of the engine RPM and the characteristic performance curve information. Simultaneously, a capacitor 37 in the timed potential storage F is connected over a transistor switch 38 with the output terminal $b$ of the integrator E, and is thus charged. As soon as the predetermined crankshaft angle $KW_1$ is terminated, the switch 38 is opened by way of a transistor 39 in the crankshaft logic element H, and charging of the capacitor 37 is terminated. The operational amplifier 34 is again reset over the switch 35 and the pulse amplifier 36 (in the crankshaft logic element H).

Resistances 40 and 41 at the input of the integrator E are adjusted so that the slope of the sawtooth-shaped signals comply with certain conditions both during the predetermined crankshaft angle $KW_1$ and during the storage time. It may be required, for example, that for a given retarded ignition, a minimum value of the amplitude signal $i_2$ be present. In such a case, there is superimposed on the slope by the resistances 40 and 41 a fraction which is a function of the amplitude signal $i_2$ and, thus, of the performance curve information. Furthermore, the resistances 40 and 41 are adjusted in such a manner that the integrator always integrates positively, i.e., that the voltage always increases. The same adjustment of the resistances 40 and 41 is made in the modified embodiment described above in connection with control of the ignition angle advance and partially represented in FIG. 5.

To the input terminal 42 of the comparator G is applied the integrated voltage $V_d'$ or a potential in proportion to such a voltage, whereas at the further input 43 is applied the sawtooth signal of predetermined slope. The operational amplifier 44 is activated on equality of the amplitudes of the two signals delivered to it.

The comparator G is forcibly controlled over the diode 45 by way of the terminal ZK so that it operates only after storage in the capacitor 37 of the timed potential storage F.

Additional diodes 46 to 49 serve to "skip" the performance curve information during starting of the engine. The diodes are timed by the flip-flop 50 in the crankshaft logic element H so that they become conductive on starting. The flip-flop 50 receives triggering pulses from terminal $kw$, i.e., from the pulse train represented in FIG. 2a, and is synchronized by the pulse train shown in FIG. 2b.

An additional flip-flop 51 in the crankshaft logic element H reduces (at the ratio of 2:1) the number pulses coming from the terminals ZK and $kw$ so that one injection pulse occurs per two ignitions.

The flip-flop 51 triggers the flip-flop K controlling the injection time and, after the predetermined interval $t_K$ has passed, is reset by the monostable multivibrator 14 in the circuit unit C. The monostable multivibrator 14 and the amplifier 15 have constructions that are known in the prior art and that need not be discussed in any detail.

Considering the performance control of fuel injection time, current $I_D$ flows through the gallium arsenide diodes 4 and 6 during the predetermined time $t_k$. Through advance setting of the desired values over the resistance 30 in the controlled pulse generator B and connection through the diode 17 at the input of the integrator L by the flip-flop K, a voltage $V_b$ is produced at the output of the operational amplifier 16 with a slope that is representative of the amplitude signal $i_t$. On resetting of the flip-flop K, after the predetermined time span $t_K$ has lapsed, the operational amplifier 16 is reoriented so that its output voltage now has a negative slope. The reorientation is obtained by the resistance 52, which, together with the temperature signal delivered over the diode 53 through the terminal $T_{II}$, controls the slope of the output voltage in point $b$. The temperature signal delivered to the terminal $T_I$ acts as a corrective factor in point 20 over the voltage divider 54,55. Over the resistance 56 there occurs a correction in accordance with the specific supply battery voltage.

Amplifiers O and N are conventional power amplifiers, and need not be described in any detail. The pump motor of the fuel pump is designated PM and is controlled by the pump relay.

Although the invention has been described with reference to specific embodiments thereof, many modifications are variations of such embodiments may be made by those skilled in the art without departing from the inventive concepts disclosed. Accordingly, all such modifications and variations are intended to be included within the spirit and scope of the appended claims.

We claim:

1. A performance control system for a spark-ignited, internal combustion engine that uses at least two operating parameters of the engine for adjustment of the engine ignition spark advance, the ignition advance being dependent upon at least one characteristic performance curve of values that vary as a function of the operating parameters, said system comprising, in combination:

a. information storage means for storing the characteristic performance curve values;
   b. information receiver means, connected to said storage means and responsive to the operating parameters, for extracting from said storage means a curve value associated with specific operating parameter values and producing an electrical signal having an amplitude related to said determined curve value;
   c. analyzer means connected to said information receiver means for receiving said signal and producing electrical pulses having duration times related to said signal amplitude, said analyzer means including:
      1. integrator means for receiving said signal during a predetermined crankshaft angle of rotation and producing an integrated voltage output;
      2. time-controlled storage means, connected to said integrator means, for storing said integrated voltage output; and
      3. comparator means connected to said time-controlled storage means for receiving and comparing said integrated voltage output to an increasing voltage signal of predetermined slope beginning at the end of said predetermined crankshaft angle of rotation, and producing an electrical pulse when said increasing voltage signal equals said integrated voltage output; and
   d. control means connected to said analyzer means for triggering said engine ignition in response to said electrical pulse.

2. A performance control system according to claim 1, wherein said analyzer means includes bypass means connected to the comparator for bypassing said integrated voltage output on actuation of the engine starter and replacing said bypassed voltage output with a predetermined voltage signal so that a constant ignition spark advance is obtained during starting of the engine.

3. A performance control system according to claim 1, wherein the system further includes (1) dynamic crankshaft angle transmitter means for producing an electrical pulse representation of the engine crankshaft angle and (2) ignition contact means for producing an electrical pulse representation of engine ignition, and further wherein said analyzer means includes logic means, connected to said information receiver means, for controlling the production of said signal and said pulse, and said logic means being responsive to said crankshaft angle pulse representation and said engine ignition pulse representation.

4. A performance control system according to claim 1, wherein the system includes static crankshaft angle transmitter means for producing at least two electrical pulse representations of at least one selected engine crankshaft angle, and further wherein the analyzer means includes logic means, connected to said information receiver means, for controlling the production of said signal and said pulse, said logic means being responsive to said crankshaft angle pulse representations.

5. A performance control system according to claim 3 wherein said logic means produces second electrical signals representative of a predetermined crankshaft angle of rotation and further wherein said analyzer means includes gate means, responsive to said second signals, for permitting reception of said signal during said predetermined crankshaft angle of rotation.

6. A performance control system according to claim 5, wherein:
said information receiver means includes current generating means, responsive to said second electrical signals, for producing a current pulse; and
said storage means includes (1) a storage layer having a plurality of surface elements of varying opacity for storage of the characteristic performances curve values and (2) at least one light source adjacent to said opaque elements for illumination therethrough, said light source being operative in response to said current pulse.

7. A performance control system according to claim 6 wherein:
said storage means includes a pair of light sources and a single supply line thereto for said current pulse; and
and information receiver means includes (1) means for receiving said light source illumination through said opaque elements and producing at least two electrical outputs and (2) gate means, responsive to said second electrical signals, for supplying said electrical outputs to said information receiver current generating means by a single supply line for said outputs.

8. A performance control system according to claim 6, wherein said at least one light source is a gallium arsenide diode.

9. A performance control system according to claim 6, wherein:
said storage means is mounted on a rotatable shaft;
said analyzer means includes flip-flop means, responsive to said logic means, for producing timed pulses representative of the number of revolutions per minute of the engine; and
said information receiver means includes shifting means, responsive to said timed pulses, for shifting said storage means shaft.

10. A performance control system for a spark-ignited, internal combustion engine that uses at least two operating parameters of the engine for adjustment of the engine ignition spark advance, the ignition advance being dependent upon at least one characteristic performance curve of values that vary as a function of the operating parameters, said system comprising, in combination;
a. information storage means for storing the characteristic performance curve values;
b. information receiver means, connected to said storage means and responsive to the operating parameters, for extracting from said storage means a curve value associated with specific operating parameter values and producing a first electrical signal having an amplitude related to said determined curve value;
c. analyzer means connected to said information receiver means for receiving said first signal and producing electrical pulses having duration times related to said first signal amplitude, said analyzer means including:
 1. first integrator means for integrating a constant voltage and producing an increasing second signal of predetermined slope during a predetermined crankshaft angle of rotation;
 2. time-controlled storage means connected to said first integrator means for storing said second signal at the end of said predetermined crankshaft angle of rotation and producing a third signal having an amplitude proportional to the amplitude of the stored signal;
 3. second integrator means for receiving said first signal at the end of said predetermined crankshaft angle of rotation and producing an integrated voltage output; and
 4. comparator means connected to said time-controlled storage means for receiving and comparing said integrated voltage output to said third signal and producing an electrical pulse when said integrated voltage output equals said third signal; and
d. control means connected to said analyzer means for triggering said engine ignition in response to said electrical pulse.

11. A performance control system according to claim 10 wherein the system further includes (1) dynamic crankshaft angle transmitter means for producing an electrical pulse representation of the engine crankshaft angle and (2) ignition contact means for producing an electrical pulse representation of engine ignition, and further wherein said analyzer means includes logic means, connected to said information receiver means, for controlling the production of said first signal and said electrical pulses, said logic means being responsive to said crankshaft angle pulse representation and said engine ignition pulse representation.

12. A performance control system according to claim 10 wherein the system includes static crankshaft angle transmitter means for producing at least two electrical pulse representations of at least one selected engine crankshaft angle, and further wherein the analyzer means includes logic means, connected to said information receiver means, for controlling the production of said first signal and said electrical pulses, said logic means being responsive to said crankshaft angle pulse representations.

13. A performance control system according to claim 11 wherein said logic means produces a fourth electrical signal representative of a predetermined crankshaft angle of rotation and further wherein said analyzer means includes gate means, responsive to said fourth electrical signal, for permitting reception of said first signal during said predetermined crankshaft angle of rotation.

14. A performance control system according to claim 13 wherein:
said information receiver means includes current generating means, responsive to said fourth electrical signal, for producing a current pulse; and
said storage means includes (1) a storage layer having a plurality of surface elements of varying opacity for storage of the characteristic performances curve values and (2) at least one light source adjacent to said opaque elements for illumination therethrough, said light source being operative in response to said current pulse.

15. A performance control system according to claim 14 wherein:
said storage means includes a pair of light sources and a single supply line thereto for said current pulse; and
said information receiver means includes (1) means for receiving said light source illumination through said opaque elements and producing at least two electrical outputs and (2) gate means, responsive to said fourth electrical signals, for supplying said electrical outputs to said information receiver current generating means by a single supply line for said outputs.

16. A performance control system according to claim 14, wherein said at least one light source is a gallium arsenide diode.

17. A performance control system according to claim 14, wherein:
said storage means is mounted on a rotatable shaft;
said analyzer means includes flip-flop means, responsive to said logic means, for producing timed pulses representative of the number of revolutions per minute of the engine; and
said information receiver means includes shifting means, responsive to said timed pulses, for shifting said storage means shaft.

18. A performance control system for a fuel-injected, internal combustion engine that uses at least two operating parameters of the engine for adjustment of the time of actuation of the engine fuel injection valves, the valve injection time being dependent upon at least one characteristic performance curve of values that vary as a function of the operating parameters, said system comprising, in combination:
a. information storage means for storing the characteristic performance curve values;
b. information receiver means, connected to said storage means and responsive to the operating parameters, for extracting from said storage means a curve value associated with specific operating parameter values and for producing a first electrical signal having an amplitude related to said determined curve value;
c. analyzer means connected to said information receiver means for receiving said first signal and producing actuating pulses having duration times related to said first signal amplitude, said analyzer means including:
1. means for receiving said first signal and producing a second signal, the amplitude of said second signal increasing as the integral of said first signal amplitude for a predetermined period and decaying at a given rate following said predetermined period, said predetermined period being initiated at a prescribed angular position of the engine crankshaft; and
2. comparator means for receiving said second signal and producing an actuating pulse beginning at the start of said predetermined period, and terminating when said second signal equals a predetermined voltage level; and
d. control means connected to said analyzer means for actuating at least one fuel-injection valve in response to said actuating pulse.

19. A performance control system according to claim 18, wherein said receiving means includes means for adjusting said given decay rate as a function of a third operating parameter of the engine.

20. A performance control system according to claim 19, wherein said third operating parameter is an engine component temperature.

21. A performance control system acccording to claim 20, wherein said component is an engine cylinder head.

22. A performance control system according to claim 18, wherein said predetermined voltage level is determined by an engine corrective factor.

23. A performance control system according to claim 22, wherein said corrective factor is the engine intake air temperature.

24. A performance control system according to claim 18, wherein said receiver means includes starter means for adjusting said given decay rate on actuation of the engine starter so that the time of actuation of the engine fuel injection valves is extended during starting of the engine.

25. A performance control system according to claim 18, wherein the system further includes (1) dynamic crankshaft angle transmitter means for producing an electrical pulse representation of the engine crankshaft angle and (2) ignition contact means for producing an electrical pulse representation of engine ignition, and further wherein said analyzer means includes logic means, connected to said information receiver means, for controlling the production of said first signal and said pulses, said logic means being responsive to said crankshaft angle pulse representation and said engine ignition pulse representation.

26. A performance control system according to claim 18, wherein the system includes static crankshaft angle transmitter means for producing at least two electrical pulse representations of at least one selected engine crankshaft angle, and further wherein the analyzer means includes logic means, connected to said information receiver means, for controlling the production of said first signal and said pulses, said logic means being responsive to said crankshaft angle pulse representations.

27. A performance control system according to claim 25, wherein said logic means produces a third electrical signal representative of a predetermined time period, and further wherein said analyzer means includes gate means, responsive to said third electrical signal, for permitting reception of said first pulse during said predetermined time period.

28. A performance control system according to claim 27, wherein:
said information receiver means includes current generating means, responsive to said third electrical signal, for producing a current pulse; and
said storage means includes (1) a storage layer having a plurality of surface elements of varying opacity for storage of the characteristic performance curve values and (2) at least one light source adjacent to said opaque elements for illumination therethrough, said light source being operative in response to said current pulse.

29. A performance control system according to claim 28 wherein:
said storage means includes a pair of light sources and a single supply line thereto for said current pulse; and
said information receiver means includes (1) means for receiving said light source illumination through said opaque elements and producing at least two electrical outputs and (2) gate means, responsive to said third electrical signals, for supplying said electrical outputs to said information receiver current generating means by a single supply line for said outputs.

30. A performance control system according to claim 28, wherein said at least one light source is a gallium arsenide diode.

31. A performance control system according to claim 28, wherein:
said storage means is mounted on a rotatable shaft;
said analyzer means includes flip-flop means, responsive to said logic means, for producing timed pulses representative of the number of revolutions per minute of the engine; and
said information receiver means includes shifting means, responsive to said timed pulses, for shifting said storage means shaft.

* * * * *